United States Patent [19]

Jelinek et al.

[11] Patent Number: 4,479,397
[45] Date of Patent: Oct. 30, 1984

[54] SHOCK/BRAKE UNIT

[75] Inventors: Ross R. Jelinek, North Tanawanda; Robert W. Reynolds, Akron, both of N.Y.

[73] Assignee: Houdaille Industries, Inc., Ft. Lauderdale, Fla.

[21] Appl. No.: 391,875

[22] Filed: Jun. 24, 1982

[51] Int. Cl.³ ............................................. F16H 27/02
[52] U.S. Cl. ............................ 74/89.15; 74/424.8 R; 188/74; 188/67; 188/110; 192/141; 192/149
[58] Field of Search ..... 74/89.15, 424.8 R, 424.8 NA, 74/424.8 VA; 188/74, 67, 110; 192/141, 143, 149; 411/260

[56] References Cited

U.S. PATENT DOCUMENTS

| | | | |
|---|---|---|---|
| 1,016,746 | 2/1912 | Herzog | 411/260 |
| 1,103,847 | 7/1914 | Schneider | 411/255 |
| 1,720,799 | 7/1929 | McLaughlin | 411/260 |
| 2,390,168 | 12/1945 | Piot | 188/67 |
| 2,572,465 | 10/1951 | Fuehrer et al. | 74/424.8 R |
| 3,170,337 | 2/1965 | Linley | 74/424.8 R |
| 3,246,680 | 4/1966 | Boyer | 411/260 X |
| 3,319,481 | 5/1967 | Goodman | 192/141 X |
| 3,611,818 | 10/1971 | Burns et al. | 74/89.15 |
| 3,718,215 | 2/1973 | Mimeur | 192/143 |
| 3,732,744 | 5/1973 | Rowland | 74/424.8 R |
| 3,762,227 | 10/1973 | Bohnhoff | 74/89.15 |
| 4,137,784 | 2/1979 | Griffin | 74/89.15 |
| 4,246,815 | 1/1981 | Hugo | 83/139 |

FOREIGN PATENT DOCUMENTS 0971139 9/1964 United Kingdom ................. 188/67

Primary Examiner—Rodney H. Bonck
Assistant Examiner—David D. House
Attorney, Agent, or Firm—Hill, Van Santen, Steadman & Simpson

[57] ABSTRACT

A ball screw brake and stop assembly having an elastomeric compression pad or elastomer member circumferentially surrounding the ball screw and received in a counter bore of a non-rotating assembly having a bore receiving the ball screw with the pad confined on its outer diameter and at one axial end. A striker member, dimensioned to be receivable within an open axial end of the counter bore, functions as a stop member limiting axial movement of the ball nut. Upon projection of the striker member into the counter bore, further movement of the ball nut causes axial compression of the elastomer member providing resistance to further axial movement of the ball nut. At the same time, radial expansion of the elastomer member, caused by compression in the axial direction, causes the inner diameter of the elastomer member to frictionally engage the outer diameter of the ball screw to break rotation of the ball screw.

13 Claims, 4 Drawing Figures

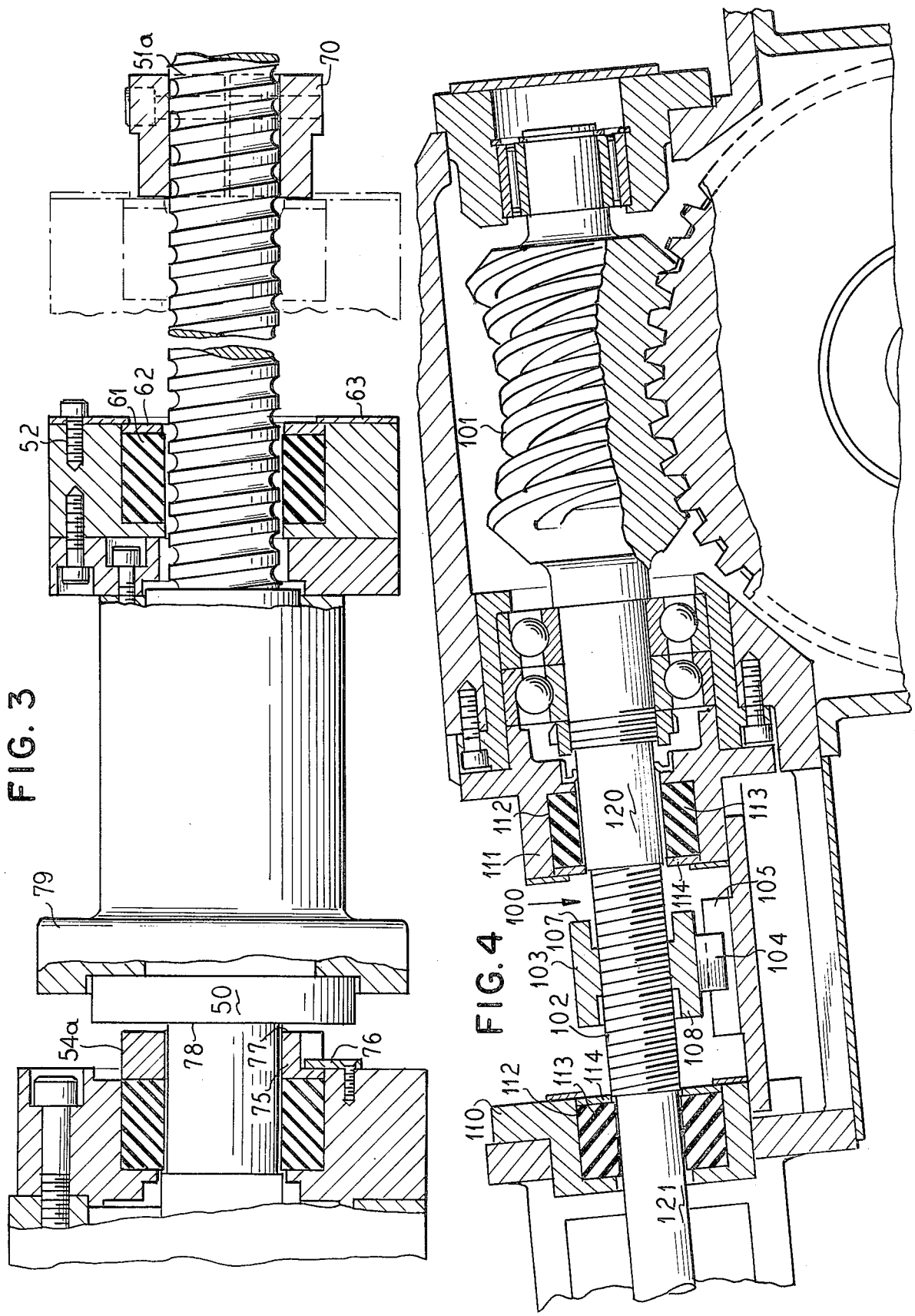

SHOCK/BRAKE UNIT

BACKGROUND OF THE INVENTION

1. Field of the Invention

This invention relates to machinery and more particularly to ball screw assemblies having limit stops.

2. Prior Art

Ball screw assemblies are frequently employed in machinery for the conversion of rotational movement to linear movement. Such assemblies include, generally, a shaft member having an outer diameter helical screw groove and a ball nut received around the shaft member with balls seated in the screw groove such that rotation of the shaft member causes axial advancement of the ball nut along the shaft. With increases in the accuracy of machining of the screw, together with advances in controllability of the rotational input to the screw, such assemblies have found wide acceptance in various machinery designs including designs where accuracy of linear positioning is critical. In many such designs, due to the use of fine pitched threads coupled with high speed rotational input, serious adverse consequences can occur if over travel of the ball nut is not prevented. However, the use of fixed limit stops absolutely precluding over travel can cause shock damage to the machinery if the ball screw contacts the limit stop at an appreciable rate of linear advance.

For this reason, it has been suggested in the art to employ yieldable limit stops either by the use of springs or elastomeric compression members. See for example, U.S. Pat. No. 3,718,215 which illustrates a device employing springs and U.S. Pat. Nos. 3,732,744 and 3,762,277 for devices employing elastomers.

While such prior suggested constructions have the ability to retard axial movement of the ball nut, they do not act directly on the ball screw which, in most installations, is the drive source for the ball nut. To the extent that rotation of the ball screw is not retarded, resistance to axial movement of the ball nut provides heightened stresses at the ball screw/ball nut interface. It would therefore be an advance in the art to provide for both yielding resistance to axial movement of the ball nut and resistance to rotation of the ball screw. It would be a further advance in the art to provide such resistances in a complementary fashion where the resistance to continued movement of each of the ball nut and ball screw is interrelated.

SUMMARY OF THE INVENTION

This invention, in a preferred embodiment, provides a ball screw brake and stop assembly wherein a rotatable ball screw which has an axially movable ball nut is received through the bore of a non-rotatable assembly which has a counter bore equipped with an elastomeric member. The counter bore is open at one axial end and an anvil member is positioned between the axial end and the elastomeric member. The elastomeric member is snuggly recieved in the counter bore such that it is provided with a substantially confined outer diameter. An axial projection carried by the ball nut is insertable into the counter bore and into contact with the anvil by axial movement of the ball nut. Further movement of the projection caused by further movement of the ball nut towards the assembly will compress or deform the elastomeric member between the anvil and the back wall of the counter bore. Due to the confined outer diameter and the counter bore back wall, the elastomeric member will radially expand inwardly into outer diameter contact with the ball screw. Resistance to linear motion of the ball nut is provided by compression or deformation resistance of the elastomeric member. Additionally, resistance to rotation of the ball screw is provided by frictional contact between the inner diameter of the radially expanding non-rotating elastomeric member and the outer diameter of the rotating ball screw. Since the frictional resistance to rotation of the ball screw is dependent upon the degree of radial expansion of the elastomeric member, which in turn is dependent upon the compression force applied by the ball nut projection, it will be appreciated that rotational resistance and axial movement resistance are interrelated and tend to increase and decrease proportionally.

It will be further appreciated that, advantageously, elastomers which are somewhat or substantially incompressible but deformable, can be utilized and in that connection the term "compression resistance", when used herein, is more nearly equatable with the term "deformation resistance." Although in the preferred embodiment the projection member is carried by the ball nut and the elastomeric pad is carried by a stationary portion of the machine receiving the ball screw, in other embodiments, the projection can be formed either on a stationary portion of the machine or on the ball screw itself with the elastomeric pad being carried by the non-rotating ball nut.

In other embodiments the anvil may substantially close the counter bore opening and may have an annulus portion projecting axially thereof so that the projection or striker face carried by the opposing member contacts the projecting annulus of the anvil without entering the counter bore.

It is therefore a principal object of this invention to provide an improved limit stop for ball screw assemblies.

It is another, and more specific, object of this invention to provide a limit stop for ball screw assemblies which yieldingly resists axial movement of the ball nut and rotation of the ball screw.

It is another, and principal object of this invention to provide an improved limit stop assembly for ball screw assemblies which utilizes an elastomeric member to both resist axial movement of the ball nut and rotational movement of the ball screw.

It is another, and more specific object of this invention, to provide an improved ball screw assembly limit stop which utilizes an elastomeric member surrounding the ball screw and engageable with means carried by the ball nut to impart resistance to axial movement of the ball nut by compression deformation of the elastomeric member and further provides resistance to rotation of the ball screw by frictional engagement with an outer diameter surface of the ball screw.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 3 is a view similar to FIG. 2 showing yet another embodiment of the limit stop assembly of this invention.

FIG. 4 is a fragmentary part sectional view of a worm gear assembly utilizing dual limit stops on the shaft of the worm.

DESCRIPTION OF THE PREFERRED EMBODIMENTS

Figure 1:
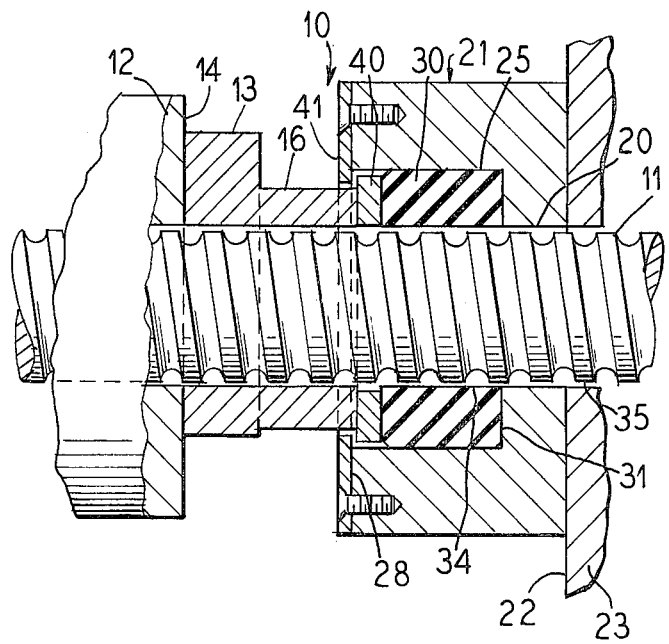
FIG. 1 is a fragmentary part sectional view of a ball screw assembly limit stop according to this invention.

As shown in FIG. 1, the ball screw brake and stop assembly 10 of this invention consists of a ball screw 11 and ball nut 12 of substantially standard design. The ball nut 12 has an axial boss member 13 affixed to an axial end 14 thereof, the boss member including an axially extending annular projection 16. The ball screw 11 is received in a bore 20 of a brake and stop member 21 which may, for example, be affixed to an end face 22 of a frame member 23. The assembly 21 is nonrotatable with respect to the ball screw. The assembly 21 includes a counter bore 25 coaxial with the bore 20, the counter bore open to the axial end face 28 of the member 21. Received in the counter bore is an elastomeric ring member of elastomer 30 which is bottomed against the bottom wall 31 of the counter bore and which is in outer diameter engagement with the inner diameter surface of the counter bore 25 so that the elastomeric member 30 is substantially confined in one axial direction and in the radially outward direction. The elastomer has an inner diameter 34 slightly larger than the outer diameter 35 of the portion of the ball screw received within the bore and counter bore.

Although it is believed that a number of different types of elastomer can be utilized, a preferred elastomer is a blended commercial grade of neoprene designated ASTM D-2000 type BC, having a durometer hardness of Shore"A" 50±5, a tensile strength (psi) of 1000 and an elongation of 300, with a specific gravity of 1.38. Specifications for such material include ASTM D-2000-75E; ASEJ 200, IBC 508, MIL R 3065 SC508.

It will be appreciated that in some embodiments it is preferable if a smooth surfaced outer diameter section of the ball screw is received interior of the elastomer member while in other embodiments, particularly those using a long pitch with a substantially flat outer diameter surface between the threads, a threaded section of the ball screw can be utilized interiorly of the elastomer member.

In the embodiment illustrated in FIG. 1, an anvil member 40 is positioned at the free axial end of the elastomer member 30 and the counter bore is partially closed by a ring 41 having an inner diameter greater than the outer diameter of the projection 16 but less than the outer diameter of the anvil 40.

In operation the device functions as follows, as the ball nut 12 moves to the right in FIG. 1 under influence of rotation of the screw 11, the projection 16 will engage the anvil 40. Further movement to the right will put a compressive load on the elastomer 30, which due to its substantially incompressible but deformable nature, will resist axial movement of the anvil by compression resistance while at the same time deforming. Because the elastomer member is trapped between the axial end wall 31 and the anvil 40 and is confined at the outer diameter, it will deform radially inwardly. By maintaining a small circumferential gap between the ball screw OD and the elastomer ID, deformation will cause contact between the elastomer ID and the ball screw. This deformation, since the elastomer is restrained in a nonrotating mounting block, will cause frictional resistance to further rotation of the ball screw. It can be appreciated that if desired, the elastomer member 30 can be notched to receive a projecting rotation preventing key carried by the mounting block.

Due to the "compression resistance" of the elastomer, axial movement of the ball screw will be resisted and further, due to the frictional engagement between the elastomer ID and ball screw OD, rotation of the ball screw will be resisted. In this manner, the ball screw and ball nut will be both brought to a stop in a manner which provides a resistance to further movement of both members rather than the heretofore utilized stop members which apply resistance only to the ball nut.

Figure 2:
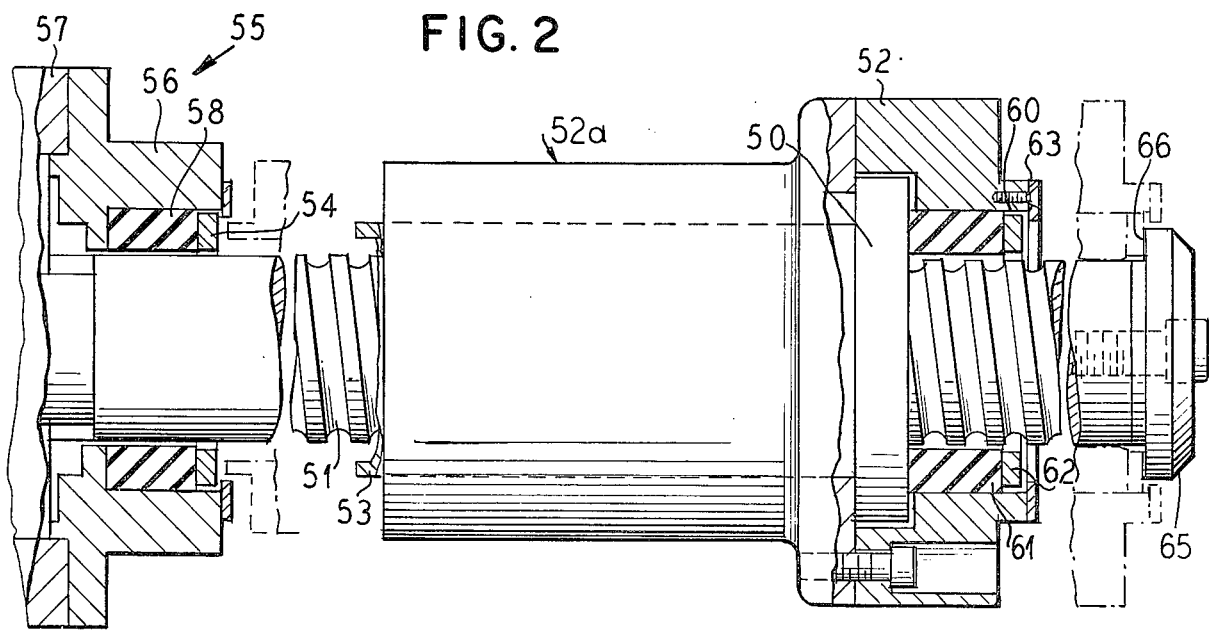
FIG. 2 is a fragmentary partially sectional view of a modified dual limit stop assembly according to this invention.

FIG. 1 illustrates the ball screw brake and stop assembly in its simplest embodiment. FIG. 2 illustrates a dual direction assembly. The ball nut 50 is received on ball screw 51 and has a mounting block 52 affixed at one axial end and an axial annulus projection 53 at the opposite axial end. The projection 53, in a manner similar to that described in FIG. 1, engages anvil 54 of brake and stop assembly 55 carried in a mounting block 56 affixed to frame member 57 at one axial end of the permissible travel span of the ball nut. Again the anvil 54 is backed by a counter bore contained elastomer ring 58 which functions to both retard axial movement of the ball nut and apply frictional resistance to rotation of the ball screw.

The mounting block 52 and ball nut 50 carried by a member 52a is similarly provided with a counter bore 60 having an elastomeric ring member or elastomer 61 received therein. An anvil 62 is provided at the open end of the counter bore and the counter bore may again be partially closed by a retainer plate 63. In this embodiment the ball screw has a diameter increased striker end 65 with the ledge face 66 of the increased diameter portion functioning in the manner of the projection 53 such that movement of the ball nut towards the right hand end of FIG. 2 will cause the face 66 to engage the anvil 62 to deform the elastomer 61. In this embodiment the projection formed by the face 66 will, of course, be rotating with respect to the non-rotating anvil and elastomer member 62, 61. If desired, a bearing assembly can be carried by the anvil to accomodate the relative rotation between the face 66 and the anvil 62 or, if desired, the engagement between the anvil and the face 66 can provide a further frictional surface to resist rotation of the ball screw.

FIG. 3 illustrates an embodiment substantially the same as the embodiment of FIG. 2, wherein, however, the striker 70 attached to the ball screw 51a in place of the striker 65 of FIG. 2, is constructed as an intermediate clamp-on member which is affixable along the length of the ball screw whereby the limit stop position of the ball nut can be determined at a given position irrespective of the length of the ball screw. Also, as illustrated, in FIG. 3, the anvil member 54a, which otherwise compares to the anvil 54 of FIG. 2, may project out of the counter bore having an inner diameter annulus portion 75 of smaller diameter than the retainer 76 and having an axial end face 77 for engagement with a flat axial end face 78 of the ball nut 50 carried by a member 79.

FIG. 4 illustrates another modified form of the invention. In this embodiment, which is illustrated in a right angle worm gear assembly, the shaft 100 of the worm gear 101, is provided with a threaded section 102 on which a threaded brake member 103 is received. A projecting key 104 attached to the threaded brake member 103 engages a stationary guide 105 parallel to the shaft thereby preventing rotation of the brake member 103. The brake member 103 has axial projecting ends 107, 108. Adjacent the ends of the threaded section 102, the shaft 100 is received interiorly of brake mounting members 110 and 111 which are provided with counter bores 112 containing elastomer rings 113 as previously described. Again, if desired, the counter bores can be closed by anvils 114 which are contactable by the axial ends 107, 108 of the brake member 103. In this embodiment the shaft 100 is provided with smooth outer diameter sections 120 and 121 lying radially inwardly respectively of the mounting blocks 110 and 111 for engagement by the inner diameter of the deformed elastomeric members 113. It will be noted that in this embodiment the brake units are positioned at either end of a limited threaded area and serve to limit the axial stoke of the nut-like brake member 103 while, at the same time, applying frictional resistance to rotation of the shaft. Further, in this embodiment, a ball screw and ball nut has been replaced by its more simplified variant, a threaded shaft and non-rotating nut. It will be understood that whenever the term "ball nut" or "ball screw" is used herein, that it is intended to include the simplified variant of threaded shaft and nut as illustrated, for example, in FIG. 4.

It will therefore be seen from the above that our invention provides an improved limit stop for ball screw assemblies employing linearly movable ball nuts wherein the limit stop includes a deformable elastomeric member surrounding the ball screw in close spaced radial relation thereto, the elastomeric member being received in a radially confined area and subjectable to an axial compression by engagement with a striker to cause radial inward deformation of the elastomer to circumferentially frictionally engage the outer diameter of the screw member while providing axial resistance to movement of the striker with respect to the elastomer. Through the use of such a system, we have assured that the limit stop will function both to resist relative axial movement between the ball nut and ball screw while at the same time providing resistance to rotation of the ball screw.

Although the teachings of our invention have herein been discussed with reference to specific theories and embodiments, it is to be understood that these are by way of illustration only and that others may wish to utilize my invention in different designs or applications.

We claim as our invention:

1. A ball screw brake and stop assembly comprising: a rotatable ball screw having an axially movable ball nut thereon, a non-rotatable member assembly surrounding an axial portion of the ball screw having a bore therethrough for receipt of the screw, a counter bore in the member assembly concentric with the bore and open to an axial end of the bore, an elastomeric member received in the counter bore having an at rest inner diameter surface closely spaced from an outer surface of the screw, a confined outer diameter, an axial end surface facing the open end of the counter bore and an opposite axial end surface bottomed against a bottom wall of the counter bore, an axial projection means associated with the nut and movable thereby dimensioned to be insertable into the counter bore, the elastomeric member being axially compressible by insertion of the projection means into the counter bore and radially expandable by axial compression, the radial expansibility of the elastomeric member being greater than the at rest spacing of the inner diameter thereof from the outer surface of the screw and the elastomeric member having a coefficient of friction effective to retard rotation of the ball screw upon radial expansion into outer surface contact with the ball screw surface and a compression resistance effective to retard axial movement of the nut upon axial compression of the elastomeric member caused by insertion of the projection means into the counter bore.

2. An assembly according to claim 1 wherein the projection means includes an axially extending striker ring projection extending axially from the ball nut having an outer diameter smaller than the outer diameter of the elastomeric member and an inner diameter greater than the outer diameter of the ball screw.

3. An assembly according to claim 2 wherein an anvil ring having an inner diameter greater than the ball screw and an outer diameter less than the counter bore is positioned between the said axial end surface of said elastomeric member which faces the open end of the counter bore and the open end of the counter bore and is dimensioned to be contacted by the projection means.

4. A device according to claim 3 wherein the outer diameter of the elastomeric member is confined by contact with the peripheral wall of the counter bore.

5. A device according to claim 4 wherein a retainer plate is provided on the stationary member having an inner diameter portion partially closing the open end of the counter bore and having an inner diameter less than the outer diameter of the anvil ring whereby the anvil ring is retained in the counter bore.

6. A method of retarding movement of a ball nut comprising:
   (a) providing a ball nut and ball screw assembly,
   (b) providing a stationary member surrounding an axial portion of the ball screw,
   (c) providing a chamber in said stationary member open to an end thereof, said chamber being concentric with the ball screw,
   (d) substantially filling portions of said chamber with an elastomeric material member having an inner diameter slightly greater than the outer diameter of the ball screw,
   (e) providing an axial projection associated with the ball nut facing the chamber,
   (f) rotating the ball screw and thereby causing axial movement of the ball nut along the ball screw, and thereby moving the projection towards the chamber,
   (g) causing axial compression of the elastomeric member by movement of the ball nut and projection,
   (h) retarding axial movement of the ball nut by resistance to compression within the elastomeric member,
   (i) radially deforming the elastomeric member as a result of the axial compression thereof and providing radially inward movement of portions of the elastomeric member,
   (j) contacting the outer surface of the ball screw by the inner diameter of the portions of the elastomeric member as a result of the radial inward movement and resisting rotation of the elastomeric member and providing frictional rotation resistance to the ball screw by frictional contact of the inner diameter of the elastomeric member with the outer surface of the ball screw to thereby retard axial movement of the ball nut by compression resistance of the elastomeric member and rotation of the ball screw by frictional resistance to relative rotation of the ball screw and elastomeric member.

7. A ball screw brake and stop assembly comprising, in combination, a rotatable ball screw having an axially movable ball nut carried thereon and movable thereby, a non-rotating member having a bore therethrough, the ball screw extending through the bore, the non-rotating member having an axial end face, a counter bore concentric with the bore open to the axial end face, the counter bore having an inner diameter larger than the outer diameter of the screw and a back wall spaced from the axial end face and a non-rotating elastomeric ring received in the counter bore bottomed against the back wall and confined by the inner diameter of the counter bore, the elastomeric ring having an inner diameter slightly larger than the outer diameter of the ball screw, the assembly including a striker member, one of the non-rotating member and striker member being in axially fixed position along the length of the ball screw and the other of the non-rotating member and striker member being movable axially of the ball screw with the ball nut, movement of the axially movable other member towards the one member causing operative engagement between the striker, the elastomeric ring and the end face and further axial movement of the one member towards the other member causing compression resistance within the elastomeric ring effective to radially deform the elastomeric ring into radially inner diameter frictional engagement with the outer diameter of the ball screw whereby axial movement of the ball nut is resisted by compression resistance of the elastomeric ring and rotational movement of the ball screw is resisted by frictional engagement with the elastomeric ring and ball screw.

8. The assembly of claim 7 including anvil means inner positioned between the striker and elastomeric ring.

9. The assembly of claim 8 wherein the striker is carried by the ball screw and the non-rotating member is carried by the ball nut.

10. The assembly of claim 8 wherein the striker is carried by the ball nut and the elastomeric ring is stationarily carried by frame means which are non-axially movable with respect to the ball screw.

11. The assembly of claim 8 wherein the striker includes an axial projection dimensioned to be received within the counter bore.

12. The assembly of claim 8 wherein the anvil includes an axial projection extending out of the counter bore for engagement by the striker.

13. A method of retarding movememt of a ball nut and rotation of ball screw carrying the ball nut comprising:
(a) providing a ball nut and ball screw assembly;
(b) providing an axially stationary member surrounding at least a portion of the ball screw;
(c) providing an axially moveble member associated with the ball nut movable towards and away from the stationary member;
(d) providing a chamber in one of said stationary member and movable member, the chamber having an open end and being concentric with the ball screw, substantially filling portions of said chamber with an elastomeric member having an inner diameter slightly greater than the outer diameter of the ball screw;
(e) providing an axial striker, surface associated with the other of the stationary member and movable member, the axial striker lying opposite the open end of the chamber;
(f) rotating the ball screw and thereby causing axial movement of the ball nut along the ball screw and thereby moving the axially movable member towards the stationary member, causing deformation of the elastomeric member by movement of the axial striker towards the open end;
(g) retarding axial movement of the ball nut by compressive resistance within the elastomeric member caused by operative engagement of the elastomeric member and the striker;
(h) radially inwardly expanding the elastomeric member as a result of the deformation thereof;
(i) contacting the outer surface of the ball screw by the inner diameter of the elastomeric member as a result, of the radially inward movement of portions of the elastomeric member; and
(j) providing frictional resistance to rotation of the ball screw by frictional contact of the inner diameter of the elastomeric member with the outer surface of the ball screw and retarding axial movement of the ball nut by compression resistance of the elastomeric member.

* * * * *